United States Patent
Andrade et al.

(10) Patent No.: US 8,490,072 B2
(45) Date of Patent: Jul. 16, 2013

(54) PARTITIONING OPERATOR FLOW GRAPHS

(75) Inventors: Henrique Andrade, Croton-on-Hudson, NY (US); Bugra Gedik, White Plains, NY (US); Kirsten W. Hildrum, Hawthorne, NY (US); Rohit M. Khandekar, Elmsford, NY (US); Sunjay S. Parekh, Dobbs Ferry, NY (US); Deepak Rajan, Fishkill, NY (US); Joel L. Wolf, Goldens Bridge, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 12/489,805

(22) Filed: Jun. 23, 2009

(65) Prior Publication Data

US 2010/0325621 A1    Dec. 23, 2010

(51) Int. Cl.
*G06F 9/44* (2006.01)
*G06F 9/45* (2006.01)

(52) U.S. Cl.
USPC ............................ 717/156; 717/132; 717/144

(58) Field of Classification Search
None
See application file for complete search history.

(56) References Cited

U.S. PATENT DOCUMENTS

| | | | | |
|---|---|---|---|---|
| 7,703,085 | B2 * | 4/2010 | Poznanovic et al. | 717/140 |
| 7,788,646 | B2 * | 8/2010 | Ward | 717/132 |
| 7,886,283 | B2 * | 2/2011 | Nacul et al. | 717/137 |
| 8,171,438 | B2 * | 5/2012 | Ward | 716/104 |
| 2007/0261041 | A1 | 11/2007 | Amini et al. | |
| 2008/0235685 | A1 | 9/2008 | Amini et al. | |
| 2009/0249309 | A1 * | 10/2009 | Li et al. | 717/132 |

OTHER PUBLICATIONS

Abadi et al. The Design of the Borealis Stream Processing Engine, Proceedings of the 2005 CIDR Conference.
Beynon et al., DataCutter: Middleware for Filtering Very Large Scientific Datasets on Archival Storage Systems, Proceedings of the 8th Goddard Conference on Mass Storage Systems and Technologies/17th IEEE Symposium on Mass Storage Systems, College Park, MD, Mar. 2000.
Caltech. Sensing and Responding: Mani Chandy's biologically inspired approach to crisis management. ENGenious—Caltech Division of Engineering and Applied Sciences, Winter 2003.
Jain et al., Design Implementation, and Evaluation of the Linear Road Benchmark on the Stream Processing Core, International Conference on Management of Data, ACM SIGMOD, Chicago, IL 2006.
Upadhyaya et al., Expressing and Exploiting Concurrency in Networked Applications with Aspen, Symposium on Principles and Practice of Parallel Programming, ACM PPoPP, San Jose, CA 2007.

(Continued)

*Primary Examiner* — Kris Rhu
(74) *Attorney, Agent, or Firm* — Ryan, Mason & Lewis, LLP (57) ABSTRACT

Techniques for partitioning an operator flow graph are provided. The techniques include receiving source code for a stream processing application, wherein the source code comprises an operator flow graph, wherein the operator flow graph comprises a plurality of operators, receiving profiling data associated with the plurality of operators and one or more processing requirements of the operators, defining a candidate partition as a coalescing of one or more of the operators into one or more sets of processing elements (PEs), using the profiling data to create one or more candidate partitions of the processing elements, using the one or more candidate partitions to choose a desired partitioning of the operator flow graph, and compiling the source code into an executable code based on the desired partitioning.

24 Claims, 8 Drawing Sheets

OTHER PUBLICATIONS

Amini et al., SPC: A Distributed, Scalable Platform for Data Mining, Workshop on Data Mining Standards, Services and Platforms, DM-SSP, Philadelphia, PA 2006.

Carzaniga et al., Design and Evaluation of a Wide-Area Even Notification Service, ACM Transactions on Computer System, 19(3):332-383, 2001.

L. Davidsen, Building an ESB without limits. ftp://ftp.software.ibm.com/software/integration/library/whitepapers/WSW11320-UsEn-00.pdf, May 2007.

Kurc et al., Querying Very Large Multi-dimensional Datasets in ADR, Proceedings of the 1999 ACM/IEEE SC Conference, SC 1999, Portland, OR, Nov. 1999.

Thies et al., StreamIt: A Language for Streaming Applications, International Conference on Compiler Construction, ICCC, Grenoble, France, Apr. 2002.

Vitter, Random Sampling with a Reservoir, ACM Transactions on Mathematical Software, 11:37-57, 1985.

Arasu et al., The CQL Continuous Query Language: Semantic Foundations and Query Execution, Technical Report, InfoLab—Stanford University, Oct. 2003.

Chakravarthy et al., Multiple Query Processing in Deductive Databases using Query Graphs, Proceedings of the 12th International Conference on Very Large Databases, Kyoto, Aug. 1986.

Pauw et al., Streamsight—A Visualization Tool for Large-Scale Streaming Applications, Symposium on Software Visualization, ACM Soft Vis, Herrsching am Ammersee, Germany, 2008.

Wolf et al., SODA: An Optimizing Scheduler for Large-Scale Stream-Based Distributed Computer Systems, Technical Report RC 24453, IBM Research, Dec. 2007.

Tu et al., Load Shedding in Stream Databases: A Control-Based Approach, Very Large Data Bases Conference, VLDB, Sep. 2006.

Arasu et al., STREAM: The Stanford Data Manager, IEEE Data Engineering Bulletin, 26, 2003.

Chandrasekaran et al., TelegraphCQ: Continuous Dataflow Processing for an Uncertain World, Conference on Innovative Data Systems Research, CIDR, 2003.

Wu et al., Challenges and Experience in Prototyping a Multi-Modal Stream Analytic and Monitoring Application on System S. Very Large Data Bases Conference, VLDB, 2007.

Gedik et al., SPADE: The System S Declarative Stream Processing Engine, International Conference on Management of Data, ACM SIGMOD, Vancouver, Canada, 2008.

Leighton et al., Multicommodity Max-flow Min-cut Theorems and their Use in Designing Approximation Algorithms, Journal of the ACM 46(6), 1999, pp. 787-832.

Andrade et al., Scale-up Strategies for Processing High-Rate Data Streams in System S, International Conference on Supercomputing, ACM ICS, 2008.

Balakrishnan et al., Retrospective on Aurora, VLDB Journal, Special Issue on Data Stream Processing, 2004.

Coral8, Inc., http://www.coral8.com, May 2007.

Gedik et at., CellSort: High Performance Sorting on the Cell Processor, Proceedings of the Very Large Data Bases Conference, VLDB, 2007.

Gedik, et al., Executing Stream Joins on the Cell Processor, Proceedings of the Very Large Data Bases Conference, VLDB, 2007.

Girod, et al., XStream: a Signal-Oriented Data Stream Management System, Proceedings of the International Conference on Data Engineering, IEEE ICDE, 2008.

Hulten et al., VFML-a toolkit for mining high-speed time-changing data streams, http://www.cs.washington.edu/dm/vfml/, 2003.

Intel. IXP2400 Network Processor Hardware Reference Manual. Technical report, Intel Corporation, May 2003.

Liu et al., Use of OWL for describing Stream Processing Components to Enable Automatic Composition, In OWL: Experiences and Directions, OWLED, 2007.

Jacques-Silva et al., Towards autonomic fault recovery in System S. In Proceedings of the International Conference on Autonomic Computing, ICAC (2007).

LOFAR. http://www.lofar.org/, Jun. 2008.

LOIS. http://www.lois-space.net/, Jun. 2008.

Olston et al., Pig Latin: A not-so-foreign language for data processing. In Proceedings of the International Conference on Management of Data, ACM SIGMOD (2008).

Li et al., Enabling dynamic composition and coordination for autonomic grid applications using the rudder agent framework. Knowledge Engineering Review, vol. 00:0, 1-15, 2006.

U.S. Appl. No. 12/130,034, filed May 30, 2008, entitled "Method for Generating a Distributed Stream Processing Application."

U.S. Appl. No. 12/139,651, filed Jun. 16, 2008, entitled "Method for High-Performance Data Stream Processing."

U.S. Appl. No. 12/465,757, filed May 14, 2009, entitled "Profile-Driven Data Stream Processing."

U.S. Appl. No. 12/466,017, filed May 14, 2009, entitled "Application Resource Model Composition from Constituent Components."

U.S. Appl. No. 12/465,910, filed May 14, 2009, entitled "Dynamically Composing Data Stream Processing Applications."

Hadoop, http://hadoop.apache.org Welcome to Hadoop! 2007 The Apache Software Foundation, pp. 1-2.

Emigh, Morningstar detangles options data, http://www.windowsfs.com/TheMag/tabid/54/articleType/ArticleView/articleId/2185/Morningstar-Detangles-Options-Data.aspx downloaded Oct. 2, 2008, pp. 1-3.

StreamBase Systems, http://www.streambase.com downloaded Oct. 2, 2008, pp. 1.

IBM Unstructured Information Management Architecture (UIMA), http://www.research.ibm.com/UIMA, downloaded Oct. 2, 2008, pp. 1-2.

Oracle, http://en.wikipedia.org/wiki/Oracle_machine downloaded Aug. 5, 2009, pp. 1-4.

Publish/Subscribe, http://en.wikipedia.org/wiki/Publish/subscribe downloaded Aug. 5, 2009, pp. 1-4.

XEP-0060: Publish-Subscribe, http://xmpp.org/extensions/xep-0060.html downloaded Aug. 5, 2009, pp. 1-126.

Roman et al., Dynamic Application Composition—Customizing the Behavior of an Active Space, downloaded Apr. 13, 2009, pp. 1-8.

Davidyuk et al., An Algorithm for Task-Based Application Composition, downloaded Apr. 13, 2009, pp. 1-8.

* cited by examiner

PARTITIONING OPERATOR FLOW GRAPHS

GOVERNMENT CONTRACT

This invention was made with Government support under Contract No.: H98230-07-C-0383 awarded by the United States Department of Defense. The government has certain rights in this invention.

FIELD OF THE INVENTION

Embodiments of the invention generally relate to information technology, and, more particularly, to data stream processing.

BACKGROUND OF THE INVENTION

Processing, analyzing and making real-time operational decisions based on immense quantities of streaming data are becoming ever more mission-critical goals for corporations and other organizations. Accordingly, stream processing systems are becoming increasingly important.

Operators represent the smallest units of work in a stream processing system. Such systems allow these operators to easily be built, customized, and connected together with other operators via streams into larger units of work known as jobs. Neither operators nor jobs are necessarily the appropriate unit of host-assignable work, however. The size of operators is typically too small, while the size of jobs is typically too big.

Therefore it would be advantageous to provide techniques for fusing fine-grained operators effectively into schedulable partitions of an optimized size, suitable for deployment in a heterogeneous processor environment.

SUMMARY OF THE INVENTION

Principles and embodiments of the invention provide techniques for partitioning operator flow graphs. An exemplary method (which may be computer-implemented) for partitioning an operator flow graph, according to one aspect of the invention, can include steps of receiving source code for a stream processing application, wherein the source code comprises an operator flow graph, wherein the operator flow graph comprises a plurality of operators, receiving profiling data associated with the plurality of operators and one or more processing requirements of the operators, defining a candidate partition as a coalescing of one or more of the operators into one or more sets of processing elements (PEs), using the profiling data to create one or more candidate partitions of the processing elements, using the one or more candidate partitions to choose a desired partitioning of the operator flow graph, and compiling the source code into an executable code based on the desired partitioning.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware component(s), (ii) software component(s), or (iii) a combination of hardware and software components; any of (i)-(iii) implement the specific techniques set forth herein, and the software components are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include techniques for creating effectively schedulable partitions from operator flow graphs in heterogeneous processor environments. The techniques detailed herein include fusion optimization in stream processing and similar computer system environments, having a capability to create jobs composed of fine grained operators connected into data flow graphs. Also, one or more embodiments of the invention include a hierarchical partitioning scheme for fusion optimization that is capable of satisfying various constraints (for example, co-location, ex-location, resource matching, high availability, etc.) and generating one or more fusion templates.

One or more embodiments of the invention fuse operators at compile-time into approximately optimal partitions known as processing elements (PEs). These PEs can be scheduled on hosts at run-time to minimize the maximum estimated utilizations of the hosts on which the PEs would hypothetically be scheduled, while simultaneously minimizing the overall communication costs between the partitions.

The techniques described herein can be implemented, for example, in stream processing systems and in other environments in which work is decomposable into flow graphs where fine-grained operators communicate with each other. As detailed herein, PEs partition the set of operators, and such PEs can become the basic deployable (schedulable) units in a system. Finding a high quality fusion significantly benefits overall performance. In order to maximize throughput, one or more embodiments of the invention minimize the processing overhead associated with inter-PE traffic while simultaneously balancing load across the processing hosts.

Additionally, one or more embodiments of the invention include a pre-processing stage, an algorithm for combinatorially solving a new sort of graph partitioning problem, a scheduling-based scheme combined with an oracle, and a post-processing stage. As used herein, an "oracle" (or oracle machine) is a commonly used term and has an understood technical meaning (that is, an entity capable of answering some collection of questions, as further described below) that would be appreciated by one skilled in the art. As detailed herein, the pre-processing component can handle special-case operators, partition coalescing, as well as high availability constraints. The graph partitioning solution is combinatorial in nature and the oracle can either return an existing partition for further splitting or return the best possible solution it has found.

Also, the binary tree formed by the graph partitioning and oracle combination can proceed until all partitions fit satisfactorily on the nodes, noting the cost at that point. A scheduling scheme can also be used to determine the quality of the fit. The process can continue until further partitioning would exceed a threshold of the initial cost. Then, the best solution between these two endpoints is returned. Further, a post-processing step may perform minor coalescing of the partitions.

As described herein, one or more embodiments of the invention can include a profiling step, an optimization step, and iterations detailed herein until the best solution is created. Additionally, one or more embodiments of the invention include profiling using an initial, trivial partition into PEs, applying the techniques detailed herein, and then iteratively profiling using the PEs dictated by the same techniques and applying the techniques again, until convergence is reached. Further, the inclusion of a user interface can allow human interaction with the process.

According to one or more embodiments of the present invention, a scheme can be provided to create effectively schedulable partitions from operator flow graphs in heterogeneous processor environments. Also, those skilled in the art will recognize that the invention applies to any system in which small operators communicate with each other in a manner that can be represented by an operator flow graph.

Figure 1:
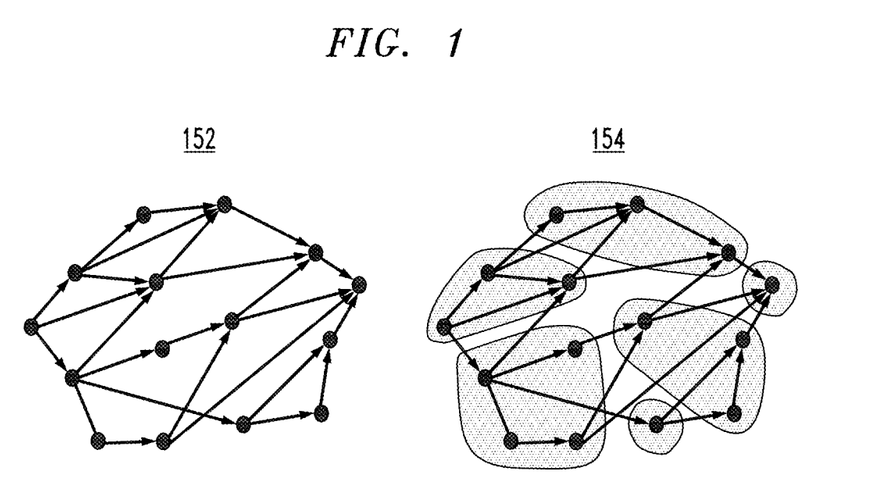
FIG. 1 is a diagram illustrating an operator-level data flow graph and a processing element- (PE-)level data flow graph, according to an embodiment of the invention.

FIG. 1 is a diagram illustrating an operator-level data flow graph 152 and a processing element- (PE-)level data flow graph 154, according to an embodiment of the invention.

As detailed herein, the bottom of a hierarchy includes operators. These operators represent the smallest visible units of work in the system. A language to create powerful, type-generic building blocks of streaming software is taught in U.S. patent application Ser. No. 12/465,757 filed on May 14, 2009 entitled "Profile-Driven Data Stream Processing," which is incorporated by reference herein. Such operators can be simple stream functors (for example, projections, filters, aggregators, etc.) or complex user-defined constructs. U.S. patent application Ser. No. 12/465,757 allows these operators to easily be built, customized, and connected together with other operators via streams.

Each of the nodes in graph 152 of FIG. 1 corresponds to an operator. The streams that transfer data between operators are shown as directed edges. The collection of nodes and directed edges is thus referred to as the operator data flow graph.

At the top of a hierarchy is the job (or application) itself. The operator data flow graph 152 in FIG. 1 might correspond to such a job. It is one of the functions of the scheduler to admit a job or not, based on its importance, the other jobs and available resources in the system.

Between these two levels of a hierarchy are processing elements (PEs). PEs typically include multiple operators, and these will be the actual units of work that are assigned by the scheduler to hosts (processing nodes). Operators are the smallest visible units (for purposes of illustration the atoms), while the PEs are the actual units of schedulable work (for purposes of illustration, the molecules). The distinction is that PEs are composed of operators. PEs correspond to processes at the operating system level. Note that both jobs and operators are created by users, while PEs are a system construct. Thinking of the operators as atoms, the PEs would be molecules. Graph 154 of FIG. 1 illustrates operators fused together into PEs.

One can, for example, think of the PEs as essentially supernodes in the original operator data flow graph. In the process of code generation, PEs are created by replacing all intra-PE streams with more efficient function call invocations of downstream operators by their upstream operators. Only inter-PE streams remain as actual streams after this fusion process (that is, the operators having been fused together). The PE supernodes and inter-PE streams can also form a directed graph, referred to as the PE data flow graph (such as, for example, graph 154).

Properly chosen PEs, rather than operators or jobs, should be the host-assignable unit of work for reasons of size. Simply put, operators can be too small and jobs can be too big. The techniques described herein include finding optimally sized PEs and optimizing the fusion of operators into PEs in an environment of heterogeneous hosts, subject to a variety of important, real-world constraints.

By way of example, as an application developer, one is primarily interested in maximizing the amount of data that is processed by the job. This can be measured as the aggregate data rate at the source (input) operators of the job, and is commonly referred to as ingest rate or throughput. Similarly, one or more embodiments of the invention attempts to minimize the total inter-PE communication. The cost of sending any data from an operator in one PE to an operator in another PE is significantly larger than that of sending it within the same PE (a function call). Smaller inter-PE communication results in smaller processing overhead for sending data across the network, resulting in potentially higher throughput. As noted herein, one can refer to a PE fusion solution that minimizes the communication overhead as an efficient solution.

The basic PE size question involves the tradeoff of efficiency for scheduling flexibility. As such, consider the two extreme solutions to the operator fusion problem. On one end of the spectrum, suppose all operators were fused into a single PE. This solution is perfectly efficient because there are no streams involved at all, and all downstream operators are invoked via function calls. However, the processing requirements of the resulting PE would almost surely be, for any realistic job, too great for any host. And even if the PE were somehow to 'fit' on a single host, the load balancing would be non-existent. The scheduler would be forced to assign work only to that host even if additional processing resources were available.

On the other end of the spectrum, suppose no operators were fused, with each operator corresponding to its own PE. This solution would be perfectly inefficient, because of the inter-PE communication costs, but the processing requirements of each PE would be as small as is feasible, and thus inherently easier to schedule in a load balanced fashion.

As such, the techniques described herein determine the ideal tradeoff between efficiency and scheduling flexibility.

The input can be information about a job being compiled by the profiling methodology, as well as a set of representative hosts. One or more embodiments of the invention operate from the top down rather than from the bottom up. For example, starting with all operators fused together into a single PE, one or more embodiments of the invention can iteratively split "large" PEs into two separate "smaller" PEs by solving a specially formulated graph partitioning scheme. Further, a PE scheduler, serving as a compile time surrogate for the run time scheduler, can hypothetically assign the resulting PEs to potential hosts in an attempt to balance the load. If the combined solution to the graph partitioning and PE scheduling problems is not satisfactory, an oracle chooses one of the current PEs to split next, and the process iterates.

Figure 2:
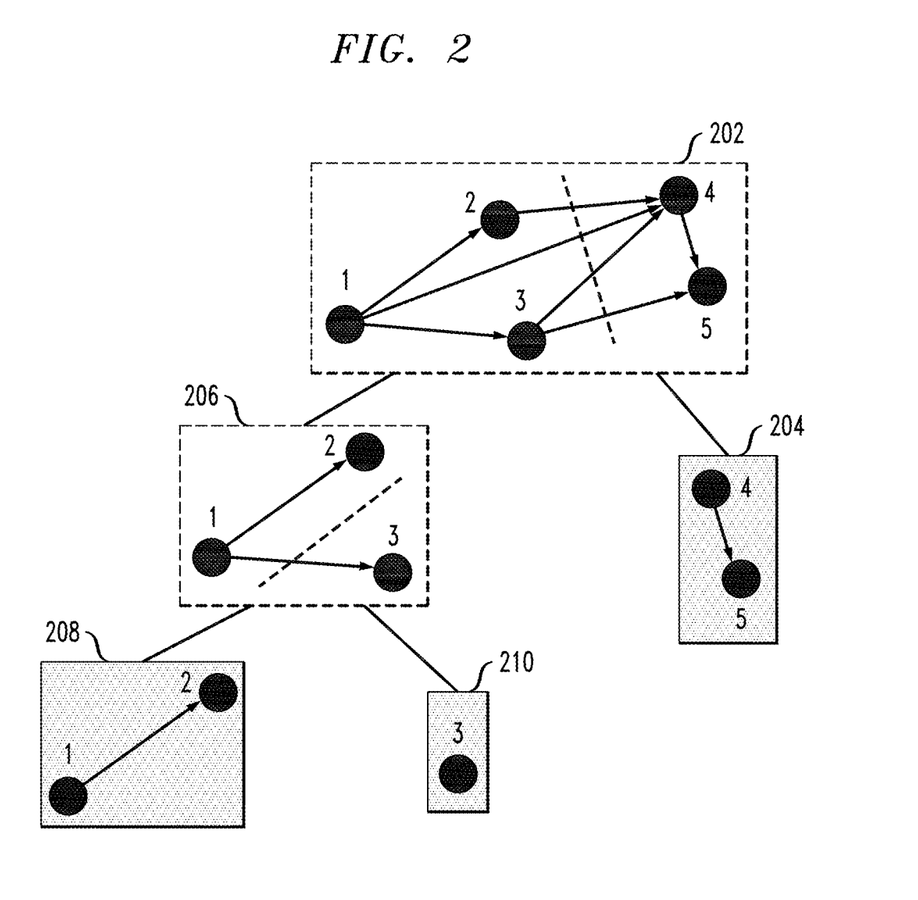
FIG. 2 is a diagram illustrating the creation of PEs, according to an embodiment of the invention.

Ultimately, the best solution found is chosen as output, and the fused PEs are compiled. FIG. 2 is a diagram illustrating the creation of PEs, according to an embodiment of the invention. By way of illustration, FIG. 2 depicts sample iterations shown in the format of a binary tree including elements 202, 204, 206, 208 and 210. At the root of the tree, all operators are in one PE. The PEs created by solving the first graph partitioning problem are shown at depth 2. The oracle can then pick one of these PEs to partition further (in the example of FIG. 2, 202 into 204 and 206, and 206 into 208 and 210), and these PEs are shown at depth 3. At the end of the last iteration, the leaf nodes of the binary tree (shown shaded, that is, elements 204, 208 and 210) represent the output PEs.

As noted herein, one or more embodiments of the invention support real-world constraints, such as the following exemplary constraints.

For instance, with a resource matching constraint, an operator may be allowed to be assigned to only a subset of the hosts. The rationale here is that some operators may need a resource or a performance capability not present on all hosts. Also, with a PE co-location constraint, two operators may be required to be fused into the same PE, with motivation including the sharing of some per-process resource, such as a Java virtual machine (JVM) instance or some other language-binding run-time.

With a host co-location constraint, two operators may be required to be assigned to the same host. PE co-location implies host co-location, but the reverse need not be true. As motivation, two operators may wish, for example, to share a host license, local files, or have shared memory segments. Additionally, with a PE ex-location constraint, two operators may be required to be fused into separate PEs. This may allow some work to continue if a PE crashes. Also, with a host ex-location constraint, two operators may be required to be assigned to separate hosts. Host ex-location implies PE ex-location, but not the reverse. Motivation for host ex-location can include a common per-process resource requirement for which a single host would be insufficient.

Figure 3:
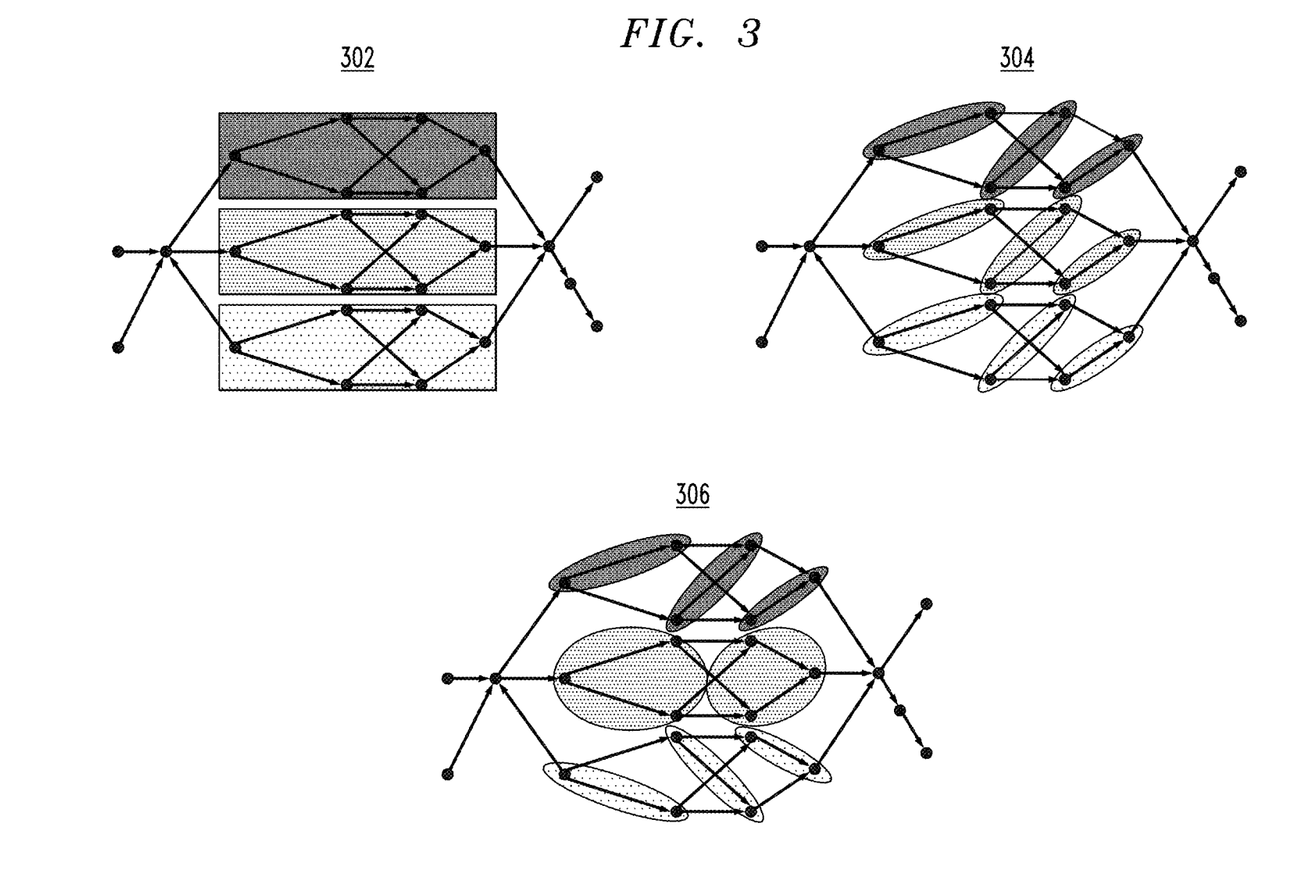
FIG. 3 is a diagram illustrating high availability (HA) sections of a data flow graph, of HA PEs when the isomorphic switch is set to on, and of HA PEs when the isomorphic switch is set to off, according to an embodiment of the invention.

With a high availability (HA) constraint, in order to support the notion of hot standbys, a sub-graph of the overall operator data flow graph may be identically replicated several times. For example, see graph 302 in FIG. 3, where there are three sub-graph replicas. FIG. 3 is a diagram illustrating diagrams of high availability (HA) sections of a data flow graph 302, of HA PEs when the isomorphic switch is set to on 304, and of HA PEs when the isomorphic switch is set to off 306, according to an embodiment of the invention.

The HA constraint requires that the fused PEs respect this sub-graph in the sense that they are either entirely contained within a single replica or do not intersect with any replicas. In FIG. 3, graph 304 and graph 306 present two feasible PE fusion solutions, with each shaded subsection corresponding to a PE. High availability constraints can also ensure that any PE contained within one replica will not be assigned to the same host as a PE contained within another replica.

Additionally, one may optionally insist that the PEs within one replica have the identical structures as those within the other replicas. An example of PEs chosen with this isomorphic condition turned on is shown in graph 304 of FIG. 3. An example of PEs chosen with the isomorphic condition switched off is shown in graph 306 of FIG. 3. In either case, there are implied host ex-location constraints for all pairs of differently shaded PEs. The motivation for all of this is, as the name implies, high availability. If the work in one replica cannot be done (perhaps, for example, because of a host failure), there will likely be immediate backups available on disjoint hosts.

It will be understood by those skilled in the art that these exemplary constraints are meant as illustrative, and that others of a similar nature could also be incorporated in the same spirit.

By way of example, one can define a directed graph G=(V, E) in which the vertices V represent the operators and the directed edges E represent the streams flowing between the operators. The operator costs $w_v \geq 0$ for $v \in V$ represent the central processing unit (CPU) overheads of the corresponding operators, and the communication costs $w_e \geq 0$ for $e \in E$ represent the CPU overheads due to sending and receiving tuples associated with the corresponding streams. CPU overheads are measured in terms of millions of instructions per second (mips). In one or more embodiments of the invention, the CPU overhead input data is made available by use of the profiling methodology taught in U.S. patent application Ser. No. 12/465,757 filed on May 14, 2009 entitled "Profile-Driven Data Stream Processing," which is incorporated by reference herein.

For a subset $S \subset V$, $\delta(S)$ denotes the set of edges with exactly one end-point in S. The size of a subset $S \subset V$ can be defined to be $$SIZE(S) = \sum_{v \in S} w_v + \sum_{e \in \delta(S)} w_e. \qquad (1)$$

Intuitively speaking, size(S) denotes the total CPU utilization that a PE including the subset of operators S would incur. Also, the streams contained completely inside a PE can be converted into function calls during compilation and incur negligible CPU overhead. For two sets S and T, one can denote the set difference (set of elements of S that are not elements of T) by $S \theta T$. To simplify the notation, one can define $w(S) = \sum_{v \in S} w_v$ and $w(\delta(S)) = \sum_{e \in \delta(S)} w_e$. Thus, size(S)=w(S)+w(δ(S)).

Assume, also, a list of hosts H={$h_1, \ldots, h_k$} with their CPU speed capacities $B_1, \ldots, B_k$, also in mips.

Those skilled in the art will recognize that constraints on operators will induce corresponding constraints on the PEs themselves. For example, a PE can be resource-matched to the intersection of all of the resource-matched hosts of operators contained in that PE.

As detailed herein, one or more embodiments of the invention ensure that the maximum utilization $U = \max_{h_i \in H} \sum_{S \in S: \Pi(S) = h_i} SIZE(S)/B_1$ is minimized, and that the overall communication cost $C = \sum_{S \in S} w(\delta(S))$ is minimized. It can be required that the maximum utilization is less than or equal to 1. This is known as the scheduling feasibility constraint.

Further, the techniques described herein can handle both goals simultaneously by minimizing an arbitrary user-supplied function f(U,C) of U and C. In one or more embodiments of the invention, this function can be a weighted average of the two metrics. This represents the tradeoff of the scheduling flexibility measured in the maximum utilization expression with the efficiency measure in the overall communication cost expression noted above.

The final solution will obey the constraints noted herein, namely resource matching, PE co-location, host co-location, PE ex-location, host ex-location and high availability, as well as obey the scheduling feasibility constraint. As such, one can refer to a solution that meets the first six noted constraints as valid, regardless of whether the solution satisfies the scheduling feasibility constraint. A valid solution which also satisfies the scheduling constraint can be referred to as feasible, as is standard.

As detailed herein, components used in one or more embodiments of the invention can include a pre-processor, an oracle, a graph partitioner, a PE scheduler and a post-processor. Also, one or more embodiments of the invention include a pre-processor stage, followed by a main stage that includes four sequential phases, and is followed by a post-processor stage.

The pre-processor can resolve the PE co-location constraints, as well as partially handle the HA constraints. Depending on whether or not HA constraints exist, there may be multiple PEs rather than a single PE by the end of the pre-processing stage.

There are multiple phases in the main stage. During phase one, the PE ex-location constraints will be resolved. During phase two, the host co-location, host ex-location and high availability constraints will be resolved, which means that the solution at this point will be valid. Alternatively, it can be shown that there is no valid solution because the graph partitioner will have split the operator flow graph all the way down into singleton operators without reaching validity. In such a case, the user will be notified of this, and the scheme will terminate. An important property of validity is that it will persist as the graph partitioning process proceeds. In the normal case that a valid solution exists, the scheme continues.

During phase three, the scheduling feasibility constraints will be resolved, meaning that there is a feasible solution to the problem. By way of example, denote the utilization at the end of phase three by u, and the overall communication cost by c. One can compute the objective function as $s=f(u, c)$. It should be observed that the overall communication cost is monotonic, in that it increases with every new graph partitioning. In one or more embodiments of the invention, the iterative process continues past this point, into phase four, and at each stage a new utilization U and a new overall communication cost C are computed.

Scheduling feasibility does not necessarily persist as PEs are split, because the aggregate sizes of the PEs increase. However, the new solution is likely to be scheduling feasible because the increased aggregate sizes should be counterbalanced by increased scheduling flexibility. If the solution is scheduling feasible, that is, if $U \leq 1$, a check is made to see if $S=f(U,C)<s$. If so, s is replaced by S, corresponding to an improved solution. The overall communication cost is constrained to be within a multiplicative user-input threshold T of the cost c of the first feasible solution: $C \leq (1+T)c$. As such, the scheme terminates when this condition fails, or when the bottom of the binary tree is reached, so that all PEs are single operators.

The value of T determines how much the scheme is willing to compromise on overall communication cost in an attempt to find more scheduling flexible solutions. For instance, if T=1, then the algorithm will continue to find more scheduling flexible solutions until the communication cost of the current solution (C) is twice the cost of the first feasible solution (c). On the other hand, if T=0, then the algorithm skips phase four completely. Additionally, as described herein, one or more embodiments of the invention include a post-processor to greedily improve the solution.

Figure 4:
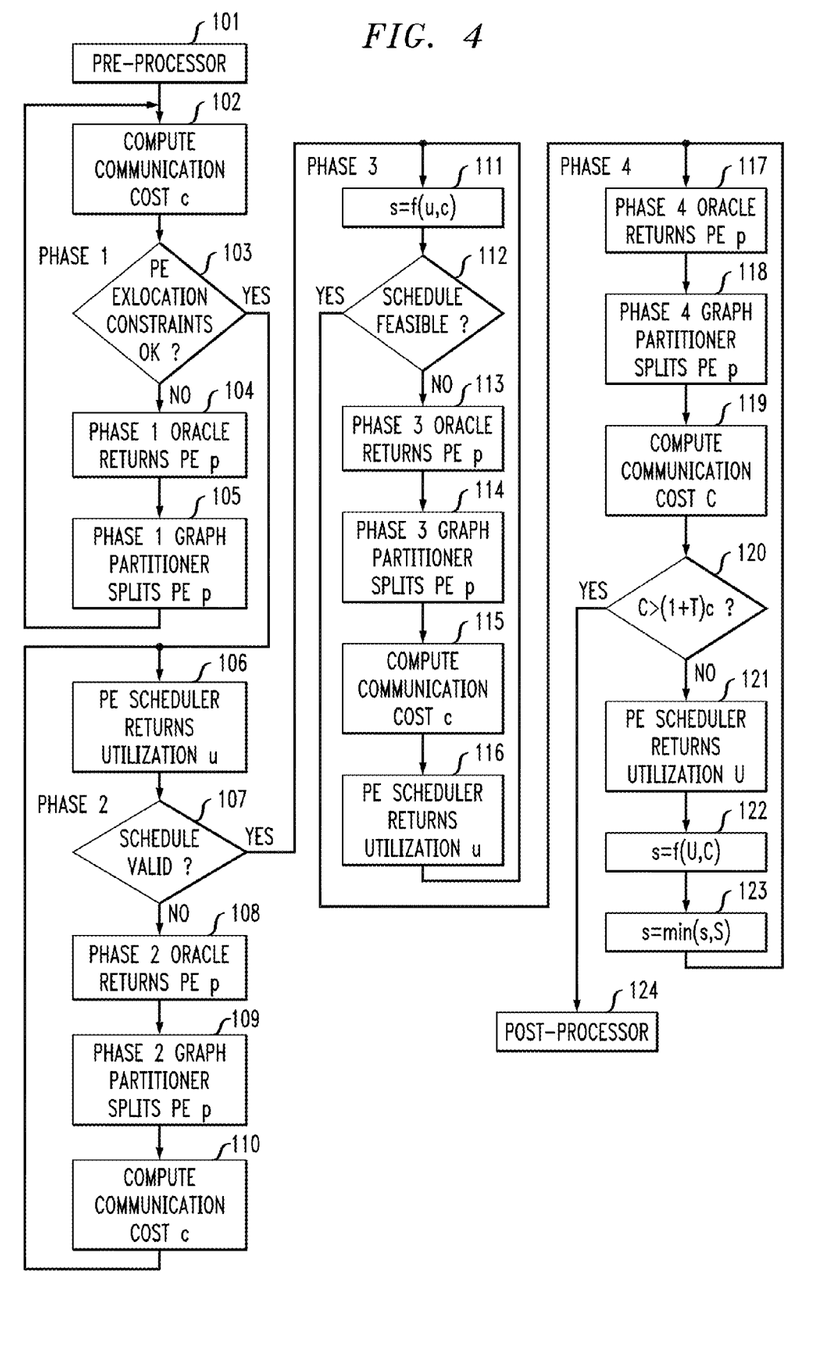
FIG. 4 is a flowchart illustrating the operation of one or more embodiments of the invention, including a pre-processor, a main stage of four phases, and a post-processor, according to an embodiment of the invention.

FIG. 4 is a flowchart illustrating the operation of one or more embodiments of the invention, including a pre-processor, a main stage of four phases, and a post-processor, according to an embodiment of the invention. By way of illustration, one or more embodiments of the invention can begin with step 101, which is the Pre-processor. Phase one of the main stage encompasses steps 102 through 105.

In step 102, the communication cost c of the current partitioning is computed (for example, as detailed herein). Step 103 determines if the PE ex-location constraints are satisfied. If they are not, step 104 invokes the phase one oracle to find a PE p to split. Then step 105 invokes the phase one graph partitioner to split that PE. Following this, control is passed back to step 102. If the PE ex-location constraints in step 103 are satisfied, phase one ends and phase two begins.

Phase two encompasses steps 106 through 110. In step 106, the PE scheduler is invoked, returning a maximum host utilization of u (for example, as detailed herein). Step 107 determines if the schedule is valid. If it is not, step 108 invokes the phase two oracle to find a PE p to split. Then, step 109 invokes the phase two graph partitioner to split that PE. In step 110, the communication cost c of the current partitioning is computed. Following this, control is passed back to step 106. If the schedule in step 107 is valid, phase two ends and phase three begins.

Phase three encompasses steps 111 through 116. In step 111, the objective function s is set to the value f(u, c). Step 112 determines if the schedule is feasible. If it is not, step 113 invokes the phase three oracle to find a PE p to split. Then, step 114 invokes the phase three graph partitioner to split that PE. In step 115, the communication cost c of the current partitioning is computed. In step 116, the PE scheduler is invoked, returning a maximum host utilization of u. Following this, control is passed back to step 111. If the schedule in step 112 is feasible, phase three ends and phase four begins.

Phase four encompasses steps 117 through 123. Step 117 invokes the phase four oracle to find a PE p to split. Step 118 invokes the phase four graph partitioner to split that PE. In step 119, the communication cost C of the current partitioning is computed. Then, step 120 compares the values of C and $(1+T)c$. If $C \leq (1+T)c$, the phase four PE scheduler is invoked in step 121, returning a maximum host utilization of U. In step 122, the objective function is set to the value of f(U,C). Then, step 123 sets s to be the minimum of s and S. If the latter corresponds to the minimum, there is a new, improved solution, and this solution is stored. Following this, control is passed back to step 117. If $C>(1+T)c$ in step 120, phase four ends, as does the main stage, and the post-processor is invoked in step 124.

As detailed herein, one or more embodiments of the invention include use of a pre-processor. The pre-processor can perform certain immediate fusions of adjacent operators into super operators, motivated by the following fact: If, for any vertex v, the communication cost of one its edges (say, e=(u, v)) is larger than the sum of the operator cost of the vertex and the communication costs of all its other incident edges, then the edge e can be collapsed by fusing vertices u and v. Thus, the pre-processor fuses adjacent operators by collapsing edges with sufficiently large communication costs.

Also, the pre-processor iteratively fuses pairs of adjacent operators {u, v} for which the condition in the above fact holds. Once {u, v} are fused into a super operator U, one or more embodiments of the invention update its weight as $w_U = w_u + w_v$ and the weight of the edges incident to U as $w_{U_x} = \Sigma x \in V \theta \{u,v\} (w_{ux} + w_{vx})$ and $w_{xU} = \Sigma x \in V \theta \{u,v\} (w_{xu} + w_{xv})$. The super operators can be treated as operators in the following iterations.

The pre-processor can also fuse PE co-located operators, as well as separate HA replicas into separate PEs. As such, there will be one PE for each HA replica, plus potentially a catchall PE for all operators not part of any HA replicas (for example, refer to FIG. 3). If the isomorphic condition is turned on, one or more embodiments of the invention can also replace each relevant operator cost with the average values of the corresponding operators across all the replicas. Similarly, the pre-processor can replace each relevant communication cost with the average values of the corresponding streams across all the replicas. Additionally, the pre-processor can mark each relevant pair of PE replicas as host-ex-located and continue to the main stage of the scheme. The resulting graph with all (super and other) operators placed in a single PE can be employed in the first iteration of the main stage of the scheme.

Figure 5:
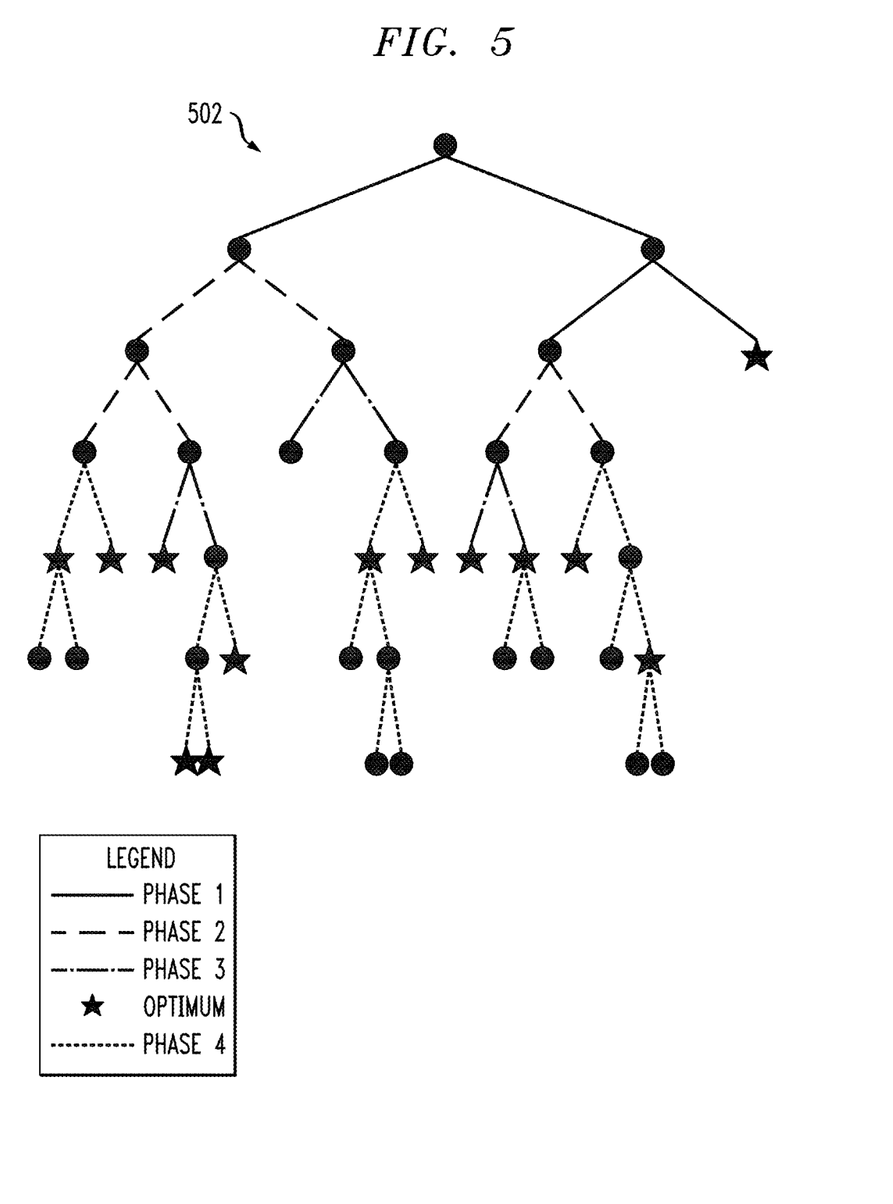
FIG. 5 is a diagram illustrating an optimal solution to the main stage of one or more embodiments of the invention and the state after each of the four phases, according to an embodiment of the invention.

FIG. 5 is a diagram illustrating an optimal solution 502 to the main stage of one or more embodiments of the invention and the state after each of the four phases, according to an embodiment of the invention. By way of illustration, FIG. 5 depicts the four iterative phases of one or more embodiments of the invention, as denoted by the legend. At the end of each phase, the scheme has moved further down the binary tree. The final solution, denoted in FIG. 5 with stars, occurs at some point in the tree between the ends of phases three and four.

As detailed herein, one or more embodiments of the invention include use of a PE scheduler. The PE scheduler is not needed in phase one, but will be employed in phases two through four. The approach is identical in each of these phases. The problem can be formulated and solved as an integer program (IP). For example, one can define decision variable $x_{p,h}$ to be 1 if PE p is assigned to host h, and 0 otherwise. Also, one can let $R_p$ denote the set of resource matched hosts for PE p. Those skilled in the art will recognize that host co-location defines an equivalence relation which is denoted by $\equiv_{HC}$. Host ex-location does not determine an equivalence relation, but one can define the set HE to be the set of pairs (p1, p2) of ex-located PEs.

As described herein, one or more embodiments of the invention solve the following:

$$\text{Minimize max}_h \sum_p \text{SIZE}(S_p) x_{p,h} / B_h \quad (2)$$

$$\text{subject to } x_{p,h} = 0 \text{ if } h \notin R_p, \quad (3)$$

$$x_{p_1,h} = x_{p_2,h} \; \forall h, \text{ if } p_1 \equiv_{HC} p_2, \quad (4)$$

$$x_{p_1,h} + x_{p_2,h} = 1 \; \forall h, \text{ if } (p_1, p_2) \in HE, \quad (5)$$

$$\sum_h x_{p,h} = 1 \; \forall p, \quad (6)$$

$$x_{p,h} \in \{0, 1\} \; \forall p, h. \quad (7)$$

The objective function (2) measures the maximum utilization of any host. Constraint (3) enforces the resource matching constraints. Constraint (4) enforces the host co-location constraints. Constraint (5) enforces the host ex-location constraints. Constraint (6) ensures that each PE is assigned to one host. Finally, constraint (7) ensures that the decision variables are binary. Additionally, in one or more embodiments of the invention, a standardly available optimization package can be used to solve this IP.

As detailed herein, one or more embodiments of the invention include use of an oracle. The oracle decides the next PE to split.

In phase one, the oracle will return any PE which fails to meet a PE ex-location constraint. This means there are at least two operators in the PE that are supposed to be PE ex-located. The choice is otherwise irrelevant, since all such constraints will need to be satisfied by the end of the phase. In each of phases two through four, the oracle is identical. It returns that PE with more than one operator that has the largest size. Splitting large PEs is an intuitively good strategy. As a side benefit, it will tend to minimize the number of calls to the graph partitioner, which is helpful because each such call adds to the overall communication cost.

Also, as described herein, one or more embodiments of the invention include use of a graph partitioner. Given a PE S, the role of the graph partitioner is to determine how to split the PE into two non-empty PEs, say $S_1$ and $S_2$. It bases its decision on two objectives:
1. to minimize the communication overhead between the resulting PEs $S_1$ and $S_2$, and
2. to avoid highly unbalanced splits that satisfy either size $(S_1) \ll \text{size}(S_2)$ or size $(S_1) \gg \text{size}(S_2)$.

To achieve these objectives, one or more embodiments of the invention use the following problem, referred to as the minimum-ratio cut or sparsest cut problem. Given a graph $H = (V_H, E_H)$ with vertex-weights $w_v \geq 0$ and edge-weights $w_e \geq 0$, one finds a cut $(S_1, S_2)$ where $S_2 = V_H \theta S_1$ such that the following ratio is minimized:

$$\frac{w(\delta(S_1))}{\min\{w(S_1), w(S_2)\}} \quad (8)$$

This objective minimizes the weight of the cut $w(\delta(S_1))$ while favoring the "balanced" cuts for which min $\{w(S_1), w(S_2)\}$ is large.

In one or more embodiments of the invention, the phase one graph partitioner can be slightly modified. In this case, it can be useful to encourage the PE ex-located operators to be split by the graph partitioning process. Thus, additional demand is added between all such operator pairs.

As such, one can set up a linear programming (LP) formulation of the sparsest cut problem as follows. By way of example, think of the graph H as a flow network where vertices are sources and sinks and the edges $e \in E_H$ are "pipes" that have flow capacity $w_e$. The LP can encode the following flow problem: Route a demand of $w_u \cdot w_v$ between each pair of vertices $u, v \in V_H$, possibly split along several paths, and minimize the maximum "congestion" on any edge. In other words, minimize $\max_{e \in E_H} f_e/w_e$, where $f_e$ denotes the flow sent on edge $e \in E$. Intuitively, a cut $(S_1, S_2)$ with a small ratio (expression 8) will have edges with high congestion because the capacity $w(\delta(S_1))$ of the cut is small compared to the total demand $w(S_1) \cdot w(S_2)$ that needs to be routed across the cut. The cut can then be identified from the fractional solution of the LP using the above intuition.

If the isomorphic condition is on and the graph partitioner splits a PE that is part of one replica, one or more embodiments of the invention will force this solution immediately on all the other replicas. Because averages are used, it does not matter which replica is chosen to be split first. If the isomorphic condition is off, each replica is split independently. Additionally, in one or more embodiments of the invention, a standardly available optimization package can be used to solve this IP.

As detailed herein, one or more embodiments of the invention include use of a post-processor. The post-processor can perform certain greedy PE merges in order to improve the solution quality without violating the property that the partitioning has a feasible assignment to hosts. The post-processor can, for example, correct for any potential less-than-perfect ordering of the graph partitioning iterations. It first determines if a pair of PEs, say $S_i$ and $S_j$, can be merged, as follows.

The post-processor tentatively merges $S_i$ and $S_j$ into a single PE $S_i \cup S_j$. If the resulting partitioning has a feasible host-assignment using the scheduling scheme, it marks this pair of PEs as mergeable. The post-processor can then greedily merge that pair of mergeable PEs which gives the maximum reduction in the total communication cost. This process can be repeated until there are no pairs that can be merged, and the resulting PEs are the output of the scheme.

Further, one should note that while the techniques detailed herein have been described in the context of a fully functioning data processing system, those of ordinary skill in the art will appreciate that the processes of the present invention are capable of being distributed in the form of a computer readable medium of instructions and a variety of forms, and that the techniques detailed herein can apply equally regardless of the particular type of signal bearing media actually used to carry out the distribution. Also, by way of example, the computer readable media may take the form of coded formats that are decoded for actual use in a particular data processing system.

Figure 6:
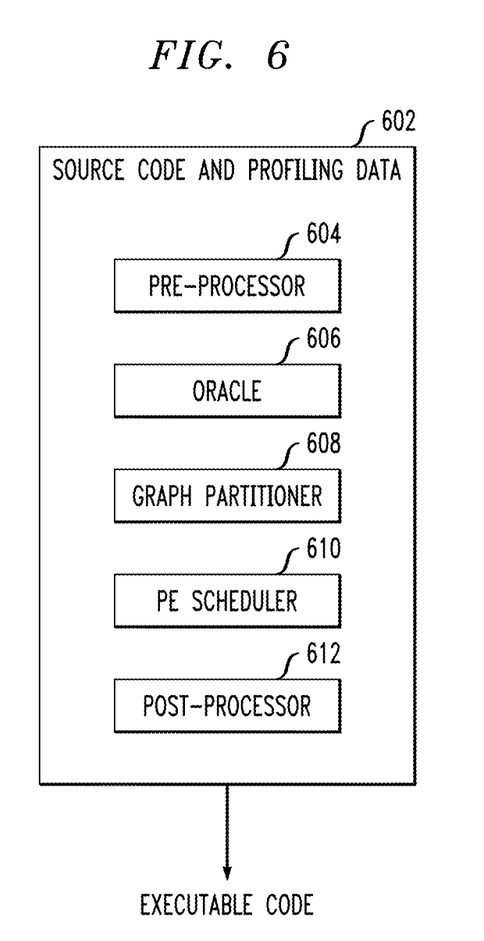
FIG. 6 is a block diagram illustrating the main components in an exemplary embodiment, according to an aspect of the invention.

FIG. 6 is a block diagram illustrating the main components in an exemplary embodiment, according to an aspect of the invention. By way of illustration, FIG. 6 depicts a system 602 that includes the components (as detailed herein) of a pre-processor 604, an oracle 606, a graph partitioner 608, a PE scheduler 610 and a post-processor 612. As described herein, the components depicted in FIG. 6 execute the technique steps of one or more embodiments of the invention that receive input data such as source code and profiling data, and output executable code. By way of example, the components illustrated in FIG. 6 can be included in a system such as, for example, a computer, and can implement steps such as detailed in the description of FIG. 7.

Figure 7:
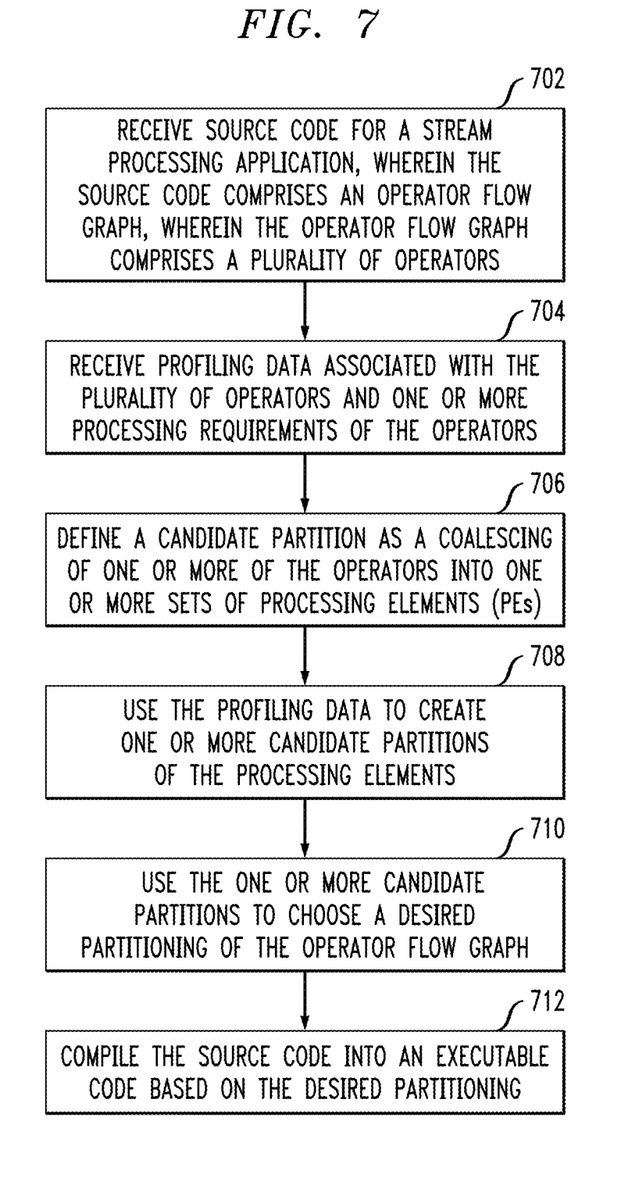
FIG. 7 is a flow diagram illustrating techniques for partitioning an operator flow graph, according to an embodiment of the invention.

FIG. 7 is a flow diagram illustrating techniques for partitioning an operator flow graph, according to an embodiment of the present invention. Step 702 includes receiving source code for a stream processing application, wherein the source code comprises an operator flow graph, wherein the operator flow graph comprises a plurality of operators. Step 704 includes receiving profiling data associated with the plurality of operators and one or more processing requirements of the operators.

Step 706 includes defining a candidate partition as a coalescing of one or more of the operators into one or more sets of processing elements (PEs). This step can be carried out, for example, using an oracle component.

Step 708 includes using the profiling data to create one or more candidate partitions of the processing elements. This step can be carried out, for example, using a graph partitioner component. Creating candidate partitions of the operator flow graph can additionally include using a tradeoff objective function that combines one or more criteria optimizations.

Step 710 includes using the one or more candidate partitions to choose a desired partitioning of the operator flow graph. This step can be carried out, for example, using a processing element schedule component. Choosing a desired partitioning of the flow graph can additionally include enabling handling of one or more constraints (for example, resource matching, PE co-location, host co-location, PE ex-location, host ex-location, high availability, and/or scheduling feasibility) as well as one or more heterogeneous processors. Also, choosing a desired partitioning of the flow graph can include using an integer programming-based scheduler, as well as incorporating a subset of one or more constraints into the integer programming-based scheduler.

Further, in one or more embodiments of the invention, using the candidate partitions to choose a desired partitioning of the operator flow graph can include choosing a desired partitioning of the operator flow graph based on an estimated quality of each partitioning (for example, based on the function f described herein).

Step 712 includes compiling the source code into an executable code based on the desired partitioning.

The techniques depicted in FIG. 7 can also include computing a size of each active partition, wherein size is defined as a sum of central processing unit (CPU) requirements for operator logic and communication. Additionally, one or more embodiments of the invention include choosing a partition containing more than one operator capable of being re-partitioned. Further, the techniques depicted in FIG. 7 can include enabling user interaction via use of a user interface.

Additionally, one or more embodiments of the invention can include profiling using an initial, trivial partition into PEs, applying the techniques detailed herein, and then iteratively profiling using the PEs dictated by the same techniques and applying the techniques detailed herein again, until convergence is reached. One or more embodiments of the invention can also include enabling user interaction via use of a user interface.

Additionally, one or more embodiments of the invention include fusing one or more atomic operators in a data flow graph into efficiently schedulable execution containers in a heterogeneous processor environment, including hierarchally partitioning a data flow graph that includes one or more processing elements (PEs).

The techniques depicted in FIG. 7 can also, as described herein, be run on a system, wherein the system includes distinct software components, each of the distinct software components being embodied on a tangible computer-readable recordable storage medium. The distinct software components can include, for example, a pre-processor component, an oracle component, a graph partitioner component, a processing element (PE) scheduler component and a post-processor component executing on a hardware processor.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 8:
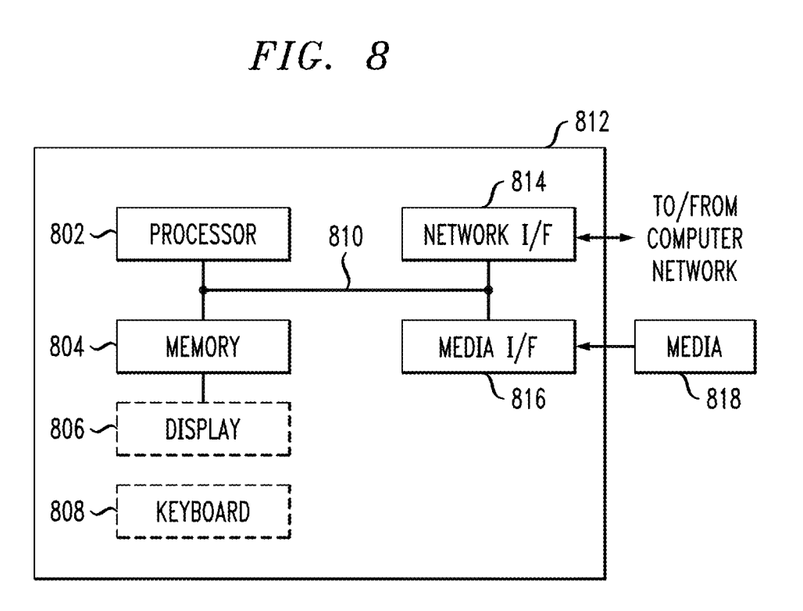
FIG. 8 is a system diagram of an exemplary computer system on which at least one embodiment of the invention can be implemented.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 818) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 804), magnetic tape, a removable computer diskette (for example media 818), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software components embodied on a tangible computer readable storage medium; the components can include any or all of the components shown in FIG. 6. The method steps can then be carried out using the distinct software components and/or sub-components of the system, as described above, executing on a hardware processor. Further, a computer program product can include a tangible computer-readable storage medium with code adapted to be executed to carry out one or more method steps described herein, including the provision of the system with the distinct software components.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, a hierarchical partitioning scheme for fusion optimization that is capable of satisfying various constraints and generating one or more fusion templates.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for partitioning an operator flow graph, wherein the method comprises:
   receiving source code for a stream processing application, wherein the source code comprises an operator flow graph, wherein the operator flow graph comprises a plurality of operators;
   receiving profiling data associated with the plurality of operators and one or more processing requirements of the operators;
   defining a candidate partition as a coalescing of one or more of the operators into one or more sets of processing elements (PEs);
   using the profiling data to create one or more candidate partitions of the processing elements;
   using the one or more candidate partitions to choose a desired partitioning of the operator flow graph;
   compiling the source code into an executable code based on the desired partitioning;
   profiling data using an initial, trivial partition into one or more processing elements (PEs);
   applying said using steps and said compiling step to the profiled data; and
   iteratively profiling said data using one or more PEs dictated by said applying step, and re-applying said using steps and said compiling step until convergence is reached.

2. The method of claim 1, wherein using the one or more candidate partitions to choose a desired partitioning of the operator flow graph comprises choosing a desired partitioning of the operator flow graph based on an estimated quality of each partitioning.

3. The method of claim 1, wherein choosing a desired partitioning of the flow graph further comprises enabling handling of one or more constraints.

4. The method of claim 3, wherein the one or more constraints comprises at least one of resource matching, PE co-location, host co-location, PE ex-location, host ex-location, high availability, and scheduling feasibility.

5. The method of claim 1, wherein choosing a desired partitioning of the flow graph further comprises enabling handling of one or more heterogeneous processors.

6. The method of claim 1, wherein creating one or more candidate partitions of the processing elements further comprises using a tradeoff objective function that combines one or more criteria optimizations.

7. The method of claim 1, further comprising computing a size of each active partition, wherein size is defined as a sum of central processing unit (CPU) requirements for operator logic and communication.

8. The method of claim 1, wherein choosing a desired partitioning of the flow graph further comprises using an integer programming-based scheduler.

9. The method of claim 8, further comprising incorporating a subset of one or more constraints into the integer programming-based scheduler.

10. The method of claim 1, further comprising choosing a partition containing more than one operator capable of being re-partitioned.

11. The method of claim 1, further comprising enabling user interaction via use of a user interface.

12. The method of claim 1, wherein the method is run on a system, wherein the system comprises one or more distinct software components, each of the one or more distinct software components being embodied on a tangible non-transitory computer-readable recordable storage medium, and wherein the one or more distinct software components comprise a pre-processor component, an oracle component, a graph partitioner component, a processing element (PE)

scheduler component and a post-processor component executing on a hardware processor.

13. A computer program product comprising a tangible non-transitory computer readable recordable storage medium including computer useable program code for partitioning an operator flow graph, the computer program product including:
   computer useable program code for receiving source code for a stream processing application, wherein the source code comprises an operator flow graph, wherein the operator flow graph comprises a plurality of operators;
   computer useable program code for receiving profiling data associated with the plurality of operators and one or more processing requirements of the operators;
   computer useable program code for defining a candidate partition as a coalescing of one or more of the operators into one or more sets of processing elements (PEs);
   computer useable program code for using the profiling data to create one or more candidate partitions of the processing elements;
   computer useable program code for using the one or more candidate partitions to choose a desired partitioning of the operator flow graph;
   computer useable program code for compiling the source code into an executable code based on the desired partitioning;
   computer useable program code for profiling data using an initial, trivial partition into one or more processing elements (PEs);
   computer useable program code for applying said using steps and said compiling step to the profiled data; and
   computer useable program code for iteratively profiling said data using one or more PEs dictated by said applying step, and re-applying said using steps and said compiling step until convergence is reached.

14. The computer program product of claim 13, wherein the computer useable program code for choosing a desired partitioning of the flow graph comprises computer useable program code for enabling handling of one or more constraints.

15. The computer program product of claim 14, wherein the one or more constraints comprises at least one of resource matching, PE co-location, host co-location, PE ex-location, host ex-location, high availability, and scheduling feasibility.

16. The computer program product of claim 13, wherein the computer useable program code for choosing a desired partitioning of the flow graph comprises computer useable program code for enabling handling of one or more heterogeneous processors.

17. The computer program product of claim 13, further comprising:
   computer useable program code for enabling user interaction via use of a user interface.

18. The computer program product of claim 13, wherein the computer usable program code comprises one or more distinct software modules, and wherein the one or more distinct software components comprise a pre-processor component, an oracle component, a graph partitioner component, a processing element (PE) scheduler component and a post-processor component executing on a hardware processor.

19. A system for partitioning an operator flow graph, comprising:
   a memory; and
   at least one processor coupled to the memory and operative to:
      receive source code for a stream processing application, wherein the source code comprises an operator flow graph, wherein the operator flow graph comprises a plurality of operators;
      receive profiling data associated with the plurality of operators and one or more processing requirements of the operators;
      define a candidate partition as a coalescing of one or more of the operators into one or more sets of processing elements (PEs);
      use the profiling data to create one or more candidate partitions of the processing elements;
      use the one or more candidate partitions to choose a desired partitioning of the operator flow graph;
      compile the source code into an executable code based on the desired partitioning;
      profile data using an initial, trivial partition into one or more processing elements (PEs);
      apply said using steps and said compiling step to the profiled data; and
      iteratively profile said data using one or more PEs dictated by said applying step, and re-applying said using steps and said compiling step until convergence is reached.

20. The system of claim 19, wherein the at least one processor coupled to the memory operative to choose a desired partitioning of the flow graph is further operative to enable handling of one or more constraints, wherein the one or more constraints comprises at least one of resource matching, PE co-location, host co-location, PE ex-location, host ex-location, high availability, and scheduling feasibility.

21. The system of claim 19, wherein the at least one processor coupled to the memory operative to choose a desired partitioning of the flow graph is further operative to enable handling of one or more heterogeneous processors.

22. The system of claim 19, wherein the at least one processor coupled to the memory is further operative to:
   enable user interaction via use of a user interface.

23. The system of claim 19, further comprising a tangible computer-readable recordable storage medium having one or more distinct software modules embodied thereon, the one or more distinct software components comprise a pre-processor component, an oracle component, a graph partitioner component, a processing element (PE) scheduler component and a post-processor component executing on a hardware processor.

24. An apparatus for partitioning an operator flow graph, the apparatus comprising:
   means for receiving source code for a stream processing application, wherein the source code comprises an operator flow graph, wherein the operator flow graph comprises a plurality of operators, carried out via a software component executing on a hardware processor;
   means for receiving profiling data associated with the plurality of operators and one or more processing requirements of the operators, carried out via a software component executing on a hardware processor;
   means for defining a candidate partition as a coalescing of one or more of the operators into one or more sets of processing elements (PEs), carried out via a software component executing on a hardware processor;
   means for using the profiling data to create one or more candidate partitions of the processing elements, carried out via a software component executing on a hardware processor;
   means for using the one or more candidate partitions to choose a desired partitioning of the operator flow graph, carried out via a software component executing on a hardware processor;
   means for compiling the source code into an executable code based on the desired partitioning, carried out via a software component executing on a hardware processor;

means for profiling data using an initial, trivial partition into one or more processing elements (PEs);
means for applying said using steps and said compiling step to the profiled data; and
means for iteratively profiling said data using one or more PEs dictated by said applying step, and re-applying said using steps and said compiling step until convergence is reached.

\* \* \* \* \*